United States Patent
Naito et al.

(10) Patent No.: US 11,858,362 B2
(45) Date of Patent: Jan. 2, 2024

(54) POWER SUPPLY DEVICE AND ELECTRIC VEHICLE PROVIDED WITH POWER SUPPLY DEVICE

(71) Applicant: SANYO Electric Co., Ltd., Daito (JP)

(72) Inventors: Masakazu Naito, Hyogo (JP); Chiharu Nakahara, Hyogo (JP); Satoru Matsuyama, Hyogo (JP); Yuusuke Okii, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 607 days.

(21) Appl. No.: 17/041,665

(22) PCT Filed: Nov. 16, 2018

(86) PCT No.: PCT/JP2018/042380
§ 371 (c)(1),
(2) Date: Sep. 25, 2020

(87) PCT Pub. No.: WO2019/187316
PCT Pub. Date: Oct. 3, 2019

(65) Prior Publication Data
US 2021/0013469 A1  Jan. 14, 2021

(30) Foreign Application Priority Data

Mar. 30, 2018  (JP) .................................. 2018-069574

(51) Int. Cl.
| | |
|---|---|
| *H01M 50/209* | (2021.01) |
| *B60L 50/64* | (2019.01) |
| *H01M 50/242* | (2021.01) |
| *H01M 50/249* | (2021.01) |
| *H01M 50/264* | (2021.01) |
| *H01M 50/224* | (2021.01) |
| *B60K 6/28* | (2007.10) |

(52) U.S. Cl.
CPC ........... *B60L 50/64* (2019.02); *H01M 50/209* (2021.01); *H01M 50/224* (2021.01);
(Continued)

(58) Field of Classification Search
CPC ....... B60L 50/64; B60K 6/28; B60Y 2200/92; B60Y 2400/112; H01M 50/209;
(Continued)

(56) References Cited

U.S. PATENT DOCUMENTS

| | | |
|---|---|---|
| 2008/0280194 A1 | 11/2008 | Okada |
| 2011/0159336 A1 | 6/2011 | Ohkura et al. |

(Continued)

FOREIGN PATENT DOCUMENTS

| | | |
|---|---|---|
| JP | 2008-282582 A | 11/2008 |
| JP | 2011-151006 A | 8/2011 |

(Continued)

OTHER PUBLICATIONS

International Search report dated Jan. 8, 2019, issued in counterpart Application No. PCT/JP2018/042380. (2 pages).

*Primary Examiner* — Michael L Dignan
(74) *Attorney, Agent, or Firm* — WHDA, LLP

(57) ABSTRACT

A power supply device has a structure in which a bind bar having bent pieces at both ends coupled to end plates disposed at both end portions of a battery stack is divided in a width direction of a side surface of the battery stack, the bent piece of each bind bar is bolted to an outer surface of one of the end plates, the one of the end plates is provided with a stopper wall that prevents rotation of a bent piece fixed with a single bolt, which is fixed to the one of the end plates via one bolt, and the bent piece is fitted to a stopper wall to prevent the displacement of the bind bar.

10 Claims, 6 Drawing Sheets

(52) U.S. Cl.
CPC ....... *H01M 50/242* (2021.01); *H01M 50/249* (2021.01); *H01M 50/264* (2021.01); *B60K 6/28* (2013.01); *B60Y 2200/92* (2013.01); *B60Y 2400/112* (2013.01); *H01M 2220/20* (2013.01)

(58) Field of Classification Search
CPC ............. H01M 50/224; H01M 50/242; H01M 50/249; H01M 50/264; H01M 2220/20; H01M 50/244
See application file for complete search history.

(56) References Cited

U.S. PATENT DOCUMENTS

| | | | | |
|---|---|---|---|---|
| 2012/0141855 | A1* | 6/2012 | Okada | H01M 50/276 429/99 |
| 2013/0183571 | A1* | 7/2013 | Miyazaki | H01M 50/264 429/156 |
| 2014/0127553 | A1* | 5/2014 | Ishibashi | H01G 11/76 429/157 |
| 2014/0295227 | A1* | 10/2014 | Aoki | H01M 50/262 429/82 |
| 2015/0144409 | A1 | 5/2015 | Fujii | |
| 2016/0036088 | A1* | 2/2016 | Tononishi | H01M 50/50 429/152 |
| 2017/0352850 | A1* | 12/2017 | Nagane | H01M 50/236 |

FOREIGN PATENT DOCUMENTS

| | | | | |
|---|---|---|---|---|
| JP | 2012-243534 A | | 12/2012 | |
| JP | 2012-094456 | * | 5/2013 | ............. H01M 2/10 |
| JP | 2016-035906 A | | 3/2016 | |
| WO | 2012/043594 A1 | | 4/2012 | |
| WO | 2014/034079 A1 | | 3/2014 | |
| WO | 2016/084272 A1 | | 6/2016 | |
| WO | WO 2016/084272 | * | 6/2016 | ............. H01M 2/10 |

\* cited by examiner

POWER SUPPLY DEVICE AND ELECTRIC VEHICLE PROVIDED WITH POWER SUPPLY DEVICE

TECHNICAL FIELD

The present invention relates to a power supply device in which a plurality of battery cells are stacked, and an electric vehicle including the power supply device, such as a hybrid automobile, a fuel cell automobile, an electric automobile, and an electric motorcycle.

BACKGROUND ART

In a power supply device in which a plurality of battery cells are stacked to form a battery stack, end plates are disposed on both end surfaces of the battery stack, and the pair of end plates disposed on both ends are coupled by a bind bar. In this power supply device, the battery stack is fixed in a pressurized state by the pair of end plates, and the battery cells are stacked so as not to be displaced. Both end portions of the bind bar are coupled to the end plates so that the end plates press the battery stack from both the end surfaces. The bind bar is provided with bent pieces by bending both end portions of the battery stack inward, and the bent pieces are fixed to surfaces of the end plates by screwing. In the power supply device having this structure, the end plates are disposed on both side surfaces of the battery stack, and the bind bar is coupled to both sides of the end plates.

In the power supply device having the above structure, the end plates disposed on both the end surfaces of the battery stack press the battery stack with a considerably strong pressure to prevent displacement of the battery cells. The bind bar is subjected to a strong tensile force by a reaction to a force that strongly presses the battery stack. Since the bind bar can be made wider in a vertical width to increase a tensile strength, the vertical width is the same as that of the battery stack and one metal plate is disposed on a side surface of the battery stack, so that the battery stack can be pressed with a strong pressure to be fixed. However, in the power supply device, the bind bar disposed on one surface of the battery stack cannot always be formed of one metal plate, and the bind bar may be required to be vertically divided. The power supply device in which the bind bar is vertically divided into two parts and fixed to the end plate has been developed (see PTL 1).

CITATION LIST

Patent Literature

PTL 1: WO2016/084272

SUMMARY OF THE INVENTION

In the power supply device in which the bind bar is vertically divided and fixed to the end plates, both end portions of each bind bar are fixed to the end plates, and the pair of end plates hold the battery stack in the pressurized state. In this power supply device, both the end portions of the bind bar are bent inward to provide bent pieces, and bolts penetrating the bent pieces are screwed into surfaces of the end plates so that the bind bar can be fixed to the end plates. In this structure, it is important to reliably fix the bent pieces to the end plates in a state where the bent pieces do not rotate, to prevent displacement of the bind bar.

The present invention has been made to solve the conventional problems described above. An object of the present invention is to provide a technique capable of preventing displacement of a bind bar and preventing lateral displacement of battery cells with an extremely simple structure.

A power supply device according to an aspect of the present invention includes a battery stack where a plurality of battery cells are stacked, a pair of end plates that are disposed at both end portions of the battery stack, and a bind bar that extends in a stacking direction of the battery cells of the battery stack and has both end portions coupled to the end plates. The battery stack is a quadrangular prism extending in the stacking direction of the battery cells, and has four surrounding surfaces including an electrode surface where sealing plates of the battery cells are disposed on the same plane, a bottom surface on an opposite side of the electrode surface, and facing side surfaces where the bind bar is disposed. The bind bar is divided in a width direction of the facing side surfaces, and each of the divided bind bars includes a bent piece that is fixed and attached to a surface of one of the end plates, and at least one of the divided bind bars further includes a bent piece fixed with a single bolt, the bent piece being fixed to the one of the end plates via one bolt. The one of the end plates includes a stopper wall where an outer peripheral edge of the bent piece fixed with a single bolt is fitted to prevent rotation. The bind bar is fixed to the one of the end plates in a state where the bent piece fixed with a single bolt is in contact with the stopper wall to prevent the rotation.

Furthermore, an electric vehicle including the power supply device provided with components according to the above aspects includes the power supply device, a running motor supplied with electric power from the power supply device, a vehicle body including the power supply device and the running motor, and wheels that are driven by the running motor to run the vehicle body.

A power supply device of the present invention is characterized by being capable of preventing displacement of a bind bar and preventing lateral displacement of battery cells by preventing rotation of a bent piece, with an extremely simple structure. In particular, the above power supply device prevents rotation of the bind bar with an extremely simple structure in which a surface of an end plate is provided with a stopper wall to which the bent piece fixed with a single bolt, which is fixed to the end plate with one bolt, is fitted. Thus, the above power supply device is characterized by being capable of reliably preventing the rotation of the bind bar while a number of bolts that fix the bent piece is reduced. Therefore, the above power supply device is characterized by being capable of preventing the displacement of the bind bar and reliably preventing the lateral displacement of the battery cells while a component cost and a manufacturing cost are reduced.

DESCRIPTION OF EMBODIMENT

Figure 1:
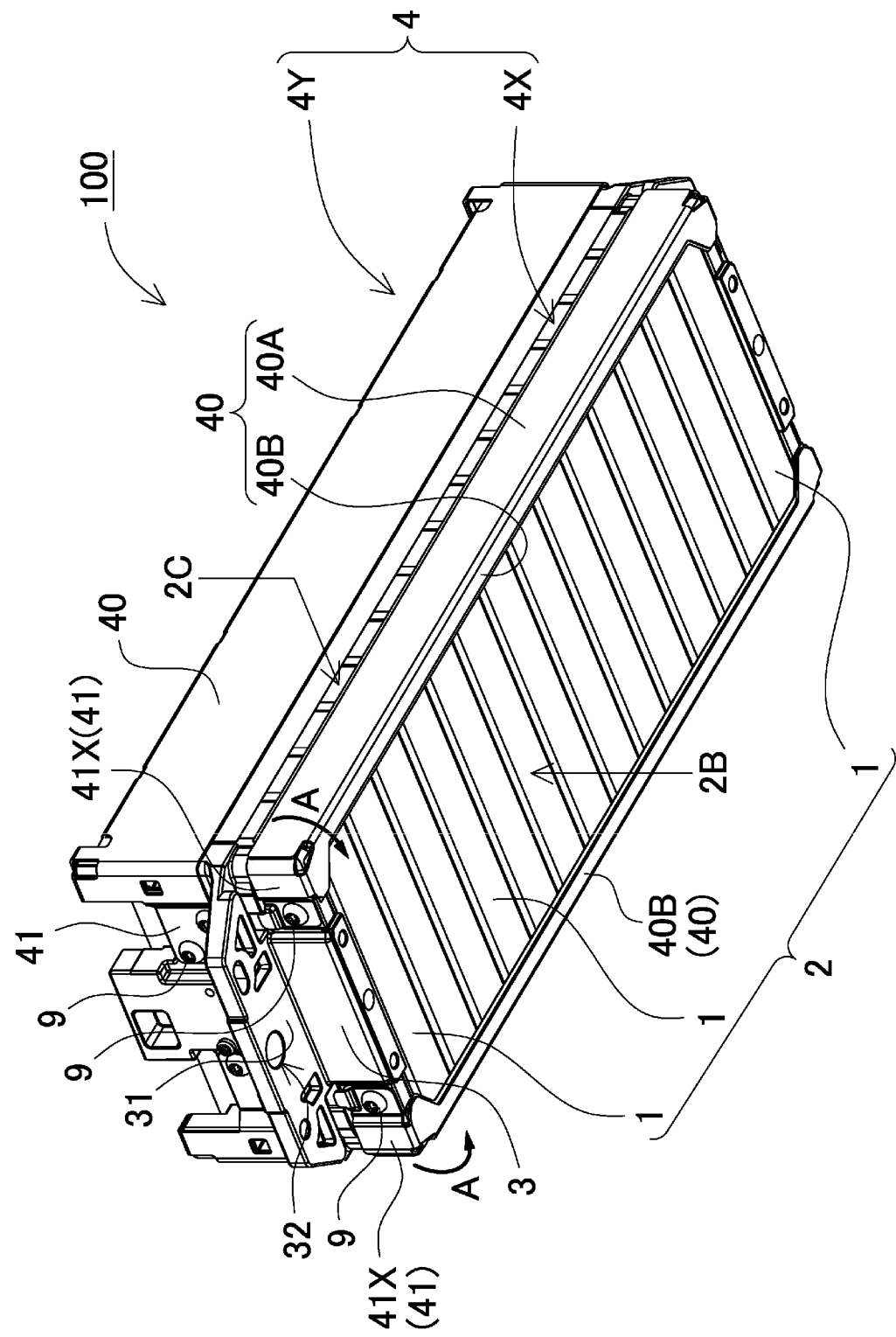
FIG. 1 is a bottom perspective view of a power supply device according to an exemplary embodiment of the present invention.

First, one point of interest of the present invention will be described. A power supply device in which a plurality of battery cells are stacked to form a battery stack and a pair of end plates disposed on both end surfaces of the battery stack are coupled by a bind bar can be made wider in a vertical width to increase a tensile strength. However, since the power supply device is required to have an optimal structure for an application, the bind bar disposed on one surface of the battery stack cannot always be formed of one metal plate, and the bind bar may be required to be vertically divided. For example, in a structure in which a fixing flange for fixing the power supply device to an external device projects in a middle in a vertical direction of the end plates, or in a structure in which there is a projecting portion in a central part of a side surface of the battery stack, the bind bar is required to be vertically divided and to be fixed the end plates. In the power supply device in which the bind bar is vertically divided and fixed to the end plates, both end portions of each bind bar are bent inward to provide bent pieces, and bolts penetrating the bent pieces are screwed into the end plates so that the bind bar can be fixed to the end plates. In this structure, the plurality of bolts penetrate the bent pieces and the bent pieces are fixed to the end plates so that the bent piece can be fixed to the end plates without rotating. However, in the structure in which the bent pieces are fixed to the end plates with the plurality of bolts, it is necessary to make the bent pieces large, and thus not all the bent pieces can be fixed to the end plates with the plurality of bolts. Furthermore, in the structure in which the bent pieces are fixed to the end plates with the plurality of bolts, a number of bolts is increased, which increases a component cost, and it takes time to assemble components, which also increases a manufacturing cost.

Meanwhile, a structure in which a bent piece is fixed to an end plate with one bolt is characterized in that assembly labor can be reduced and the component cost can be reduced. However, in the structure of fixing the bent piece with one bolt, it is extremely difficult to reliably prevent the bent piece from rotating around the bolt on a surface of the end plate. In particular, in a use environment subject to vibration, the bent piece may rotate on the surface of the end plate and a fixed position may be displaced. When the bent piece rotates and the bind bar cannot be disposed at a fixed position on a side surface of the battery stack, battery cells are laterally displaced and various adverse effects occur. For example, if the battery cells are laterally displaced, an unreasonable force acts on a coupling portion between a metal plate bus bar that electrically connects the battery cells and a battery, which causes continuous damage, and in a worst case, causes a battery cell to pop out. Therefore, it is important to consider a structure that can prevent rotation of the bent pieces and prevent displacement of the bind bar while the bent pieces at both ends of the vertically divided bind bars are each fixed to the end plate with one bolt.

A power supply device according to an aspect of the present invention may be specified by the following configurations. The power supply device includes battery stack 2 where a plurality of battery cells 1 are stacked, a pair of end plates 3 that are disposed at both end portions of battery stack 2, and bind bar 4 that extends in a stacking direction of battery cells 1 of battery stack 2 and has both end portions coupled to end plates 3. Battery stack 2 is a quadrangular prism extending in the stacking direction of battery cells 1, and has four surrounding surfaces including electrode surface 2A where sealing plates 12 of battery cells 1 are disposed on the same plane, bottom surface 2B on an opposite side of electrode surface 2A, and facing side surfaces 2C where bind bar 4 is disposed. Bind bar 4 is divided in a width direction of facing side surfaces 2C, and each of divided bind bars 4 includes bent piece 41 that is fixed and attached to a surface of one of end plates 3. Furthermore, at least one of divided bind bars 4 includes bent piece 41X fixed with a single bolt, which is fixed to the one of end plates 3 via one bolt 9, the one of end plate 3 includes stopper wall 34 where an outer peripheral edge of bent piece 41X fixed with a single bolt is fitted to prevent rotation of the bind bar, and bent piece 41X fixed with a single bolt is in contact with stopper wall 34 to be fixed to the one of end plates 3 in a state where the rotation of the bind bar is prevented.

Note that, in the present specification, the width direction of facing side surfaces 2C of battery stack 2 means a vertical direction in the drawings. In addition, in the present specification, a vertical direction of battery stack 2 is a direction illustrated in the drawings, and electrode surface 2A of battery stack 2 is an upper direction and bottom surface 2B is a lower direction.

Bent piece 41X of bind bar 4, which is fixed with a single bolt, may include fixing portion 45 that is bolted to an outer surface of the one of end plates 3, and fixing portion 45 may be provided with stopper protrusion 44 at a position facing stopper wall 34. This power supply device is characterized by being capable of bringing the stopper protrusion of the bent piece into contact with the stopper wall of the end plate to more effectively prevent the rotation of the bind bar and reliably prevent lateral displacement of the battery cells.

Bind bar 4 may include first bind bar 4X that is disposed on a side of bottom surface 2B of battery stack 2 and second bind bar 4Y that is disposed on a side of electrode surface 2A of battery stack 2, and first bind bar 4X may include bent piece 41X fixed with a single bolt. In this power supply device, it is possible to prevent displacement of the bind bar and prevent lateral displacement of the battery cells while the first bind bar disposed on a lower side has a simple structure.

Bent piece (=board) 41X fixed with a single bolt is provided with stopper protrusion 44 and bolt hole 43 where bolt 9 is inserted, which are apart from each other, and bolt hole 43 is preferably disposed closer to bottom surface 2B of battery stack 2 than stopper protrusion 44. This power supply device is characterized by being capable of more reliably preventing the rotation of the bent piece fixed with a single bolt, since the bolt hole and the stopper protrusion are disposed vertically apart from each other. In addition, since the bent piece fixed with a single bolt has the bolt hole disposed on a side of the bottom surface of the battery stack and the stopper protrusion disposed on an opposite side, it is possible to dispose, as a strong structure, the stopper wall provided on the end plate apart from the bottom surface of the battery stack, that is, unevenly distributed in a central part of the end plate. Therefore, the stopper wall can reliably prevent the rotation of the bent piece fixed with a single bolt, and the lateral displacement of the battery cells due to the rotation of the bind bar can be effectively prevented.

Bent piece 41X of bind bar 4, which is fixed with a single bolt, may include fixing portion 45 that is fixed and attached to the one of end plates 3 via bolt 9, and extension portion 46 provided between fixing portion 45 and corner portion 42 of bind bar 4, fixing portion 45 may be step protrusion 49 projecting in a direction approaching the surface of the one of end plates 3, the one of end plates 3 may include positioning recess 39 where step protrusion 49 is fitted, and step protrusion 49 may be disposed on positioning recess 39 to prevent the rotation of bind bar 4.

The above power supply device is characterized by, in addition to locking the stopper protrusion of the bent piece to the end plate, further fitting the step protrusion of the bind bar to the positioning recess of the end plate, so that the displacement of the bind bar can be prevented more reliably and the lateral displacement of the battery cells can be prevented. This is because the step protrusion is firmly fixed to the positioning recess of the end plate with the bolt, and the positioning recess can be fixed to the positioning recess in a fitted state.

The one of end plates 3 may have an upper edge of stopper wall 34 formed as planar projecting surface 37, stopper protrusion 44 of bind bar 4 may include cover plate 47 that is disposed on projecting surface 37 of stopper wall 34 of the one of end plates 3, and peripheral wall portion 48 that couples an outer peripheral edge of cover plate 47 to fixing portion 45, cover plate 47 may be disposed on projecting surface 37 of stopper wall 34, and peripheral wall portion 48 may be in contact with stopper wall 34 to prevent the rotation of bind bar 4.

The above power supply device is characterized in that the stopper protrusion can be made to have a strong structure, and thus the stopper protrusion is prevented from being deformed, and the displacement of the bind bar in which the bent piece is fixed to the end plate with one bolt is reliably prevented, so that lateral displacement of the battery cells is prevented.

Peripheral wall portion 48 may include horizontal rib 48A and vertical rib 48B extending in directions intersecting with each other. The stopper protrusion is characterized by being capable of preventing from being deformed, by the horizontal rib and the vertical rib reinforcing each other, and thus the stopper protrusion, which is difficult to deform, can be locked to the end plate to reliably prevent the displacement of the bind bar.

In peripheral wall portion 48, horizontal rib 48A may be a rib extending in a width direction of end plates 3, and vertical rib 48B may be a rib extending in a direction intersecting with horizontal rib 48A.

In the power supply device, bind bar 4 may be a metal plate, and each of end plates 3 may be a metal block having a structure where the entire end plate 3 is integrated. The above power supply device is characterized in that both the bind bar and the end plate have strong structures and the battery cells can be held without displacement while the end plate and the bind bar are mass-produced at a low cost.

Hereinafter, the present invention will be described in detail with reference to the drawings. Note that, in the following description, terms indicating a specific direction or position (for example, "upper", "lower", and other terms including those terms) are used as necessary, but use of these terms is for facilitating understanding of the invention with reference to the drawings, and the technical scope of the present invention is not limited by meanings of these terms. Furthermore, portions having the same reference numerals appearing in a plurality of drawings indicate the same or equivalent portions or members.

Moreover, an exemplary embodiment described below exemplifies a power supply device for embodying the technical idea of the present invention and an electric vehicle including the power supply device, and the present invention is not limited to the following. Furthermore, size, materials, and shapes of components, relative disposition between the components, and the like described below are not intended to limit the scope of the present invention thereto as long as there is no specific description, and are intended for exemplification. Furthermore, contents described in one exemplary embodiment and example can be applied to other exemplary embodiments and examples. Furthermore, the sizes and positional relationships of members illustrated in the drawings may be exaggerated in order to clarify description.

(Power Supply Device 100)

Figure 2:
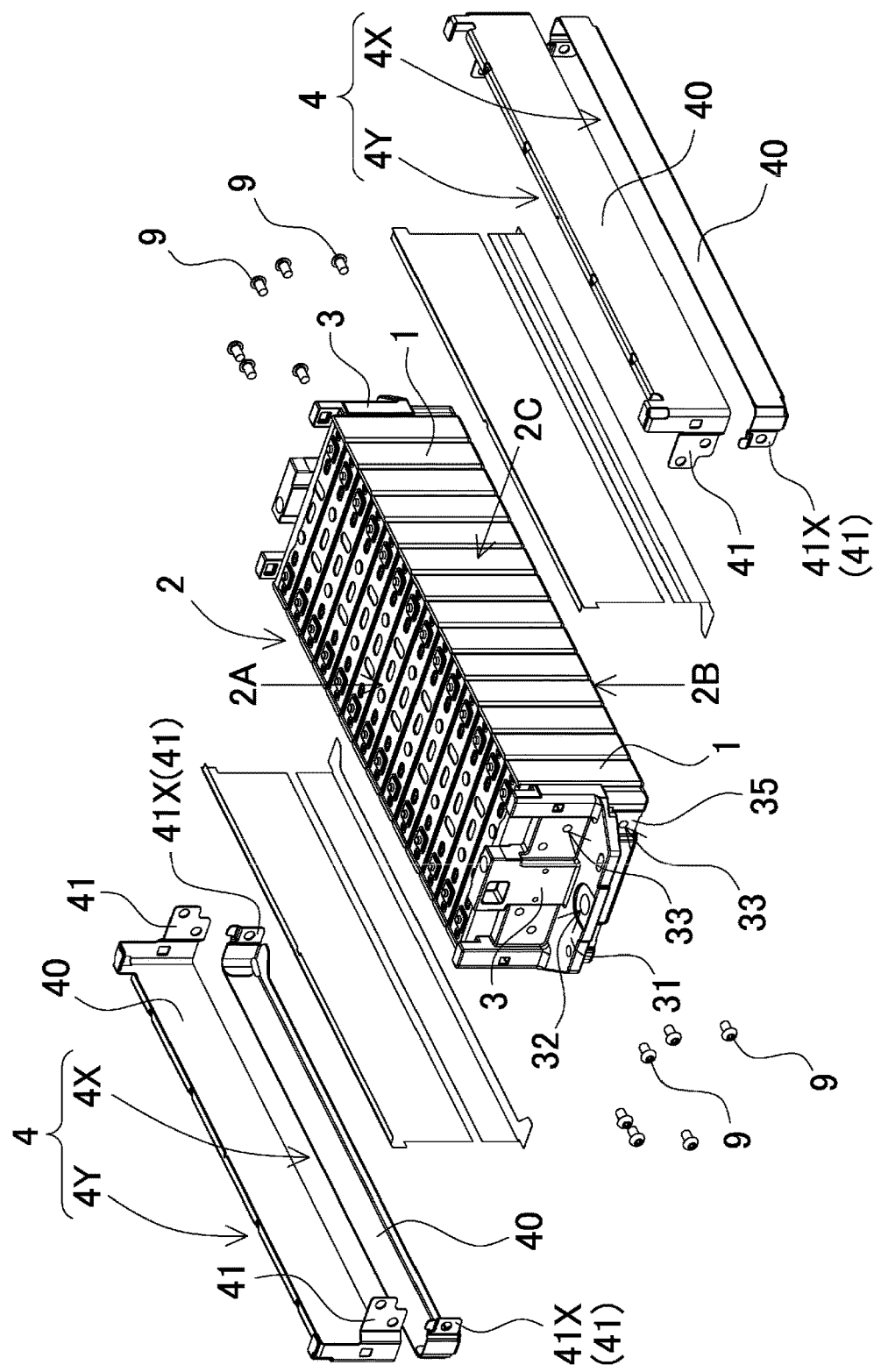
FIG. 2 is an exploded perspective view of the power supply device according to the exemplary embodiment of the present invention.
Figure 3:
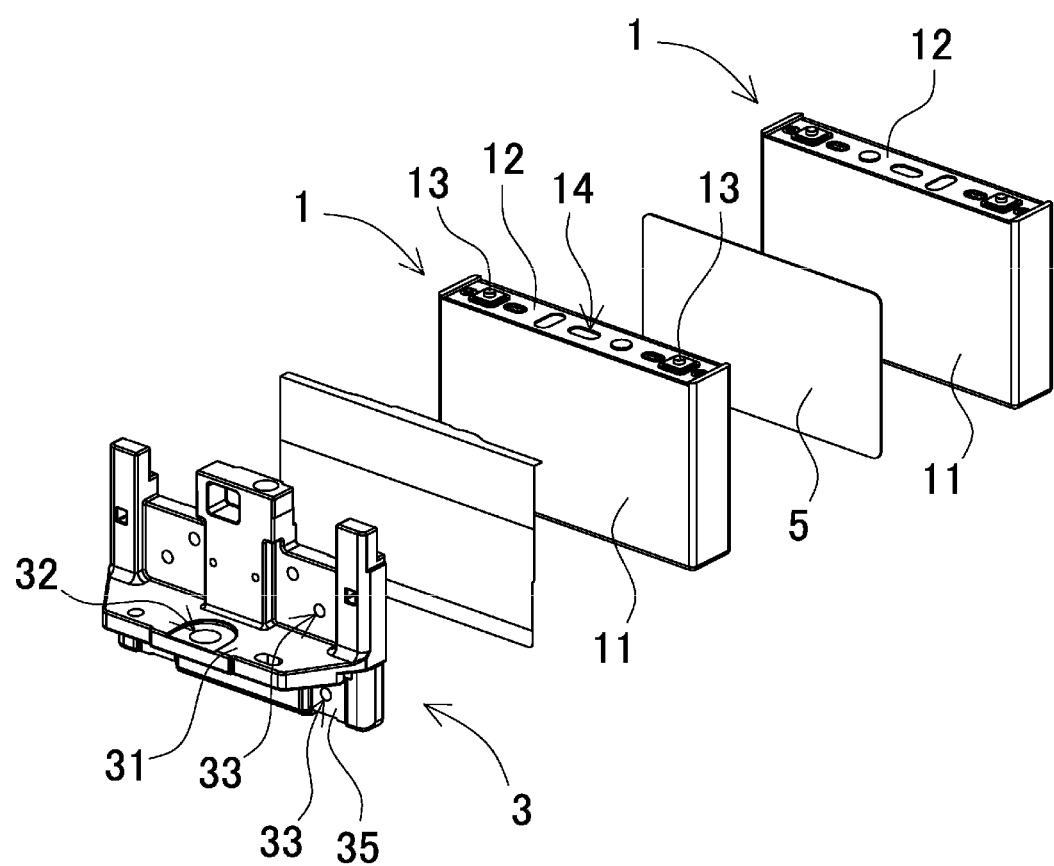
FIG. 3 is an exploded perspective view illustrating a stacked structure of battery cells of a battery stack illustrated in FIG. 2.

Power supply device 100 illustrated in FIGS. 1 to 3 includes a pair of end plates 3 that are disposed on both end surfaces in a stacking direction of battery stack 2 in which a plurality of battery cells 1 are stacked via insulating separators 5, and bind bar 4 that is disposed on both side surfaces of battery stack 2 and has both ends coupled to end plates 3. Bind bar 4 is provided with bent pieces 41 at both end portions of main body 40 disposed on both the side surfaces of battery stack 2, and bent pieces 41 are bolted to outer side surface of end plates 3.

(Battery Stack 2)

Battery stack 2 is a quadrangular prism in which the plurality of battery cells 1 are stacked and that extend in the stacking direction of battery cells 1. Battery stack 2 is a quadrangular prism having four surrounding surfaces consisting of sealing plates 12 of battery cells 1, that is, electrode surface 2A on which electrodes are disposed, bottom surface 2B an opposite side of electrode surface 2A, and facing side surfaces 2C on which bind bar 4 is disposed. As illustrated in the figures, power supply device 100 is mainly used in a posture in which an upper surface of battery stack 2 is electrode surface 2A and a lower surface is bottom surface 2B, but can also be used vertically inverted or in a posture rotated 90 degrees.

(Battery Cell 1)

Battery cell 1 is a prismatic battery having an outer shape in which a thickness is smaller than a width. Battery cell 1 is a lithium ion secondary battery. However, as battery cell 1, all chargeable and dischargeable secondary batteries such as a nickel hydrogen secondary battery can be used instead of the lithium ion secondary battery. In particular, when the lithium ion secondary battery is used for battery cell 1, there is a feature that a charging capacity for a volume or mass of the entire secondary battery can be increased.

As illustrated in FIG. 3, battery cell 1 is provided with positive and negative electrode terminals 13 on sealing plate 12 that closes an opening of exterior can 11. Electrode terminals 13 are connected to positive and negative electrode bodies (not illustrated) built in exterior can 11. Exterior can 11 has a rectangular tubular shape with a bottom closed and facing surfaces being wide surfaces, and is open at a top in the figure. Exterior can 11 having this shape is manufactured by a metal plate such as aluminum or aluminum alloy being pressed. The opening of exterior can 11 is closed by laser welding with flat plate-shaped sealing plate 12 obtained by a metal plate being pressed.

Sealing plate 12 is provided with exhaust valve 14 between the pair of electrode terminals 13. Exhaust valve 14 is configured to be opened when an internal pressure of exterior can 11 rises to a predetermined value or higher, so that internal gas can be released. Opening exhaust valve 14 makes it possible to inhibit an increase in the internal pressure of exterior can 11. Exhaust valve 14 is preferably disposed substantially at a center of sealing plate 12 in a longitudinal direction. With this structure, even if adjacent battery cells 1 are stacked in a posture in which adjacent battery cells 1 are inverted in a width direction, exhaust valves 14 can always be aligned on the center of sealing plates 12.

(End Plate 3)

The pair of end plates 3 are disposed on both the end surfaces of battery stack 2 in which battery cells 1 and insulating separators 5 are alternately stacked, and battery stack 2 is fastened by the pair of end plates 3 in a pressurized state. Each of end plates 3 is made of a material exhibiting sufficient strength, for example, metal such as aluminum (in this specification, "aluminum" is used as a meaning including an aluminum alloy), and can have sufficient strength while being lightened. End plates 3 each has an outer shape substantially equal to an outer shape of battery cell 1 or slightly larger than the outer shape of battery cell 1, and fix the entire end surfaces of battery stack 2 in the pressurized state. Note that end plates 3 may be configured to each have an outer shape smaller than the outer shape of battery cell 1. When end plates configured to each have the outer shape smaller than the outer shape of battery cell 1 are employed, there is an advantage that spaces can be secured above the end plates and the power supply device can be downsized, for example.

Power supply device 100 is used by being fixed to an external device such as a vehicle. End plate 3 in FIG. 1 is provided with fixing flange 31 for fixing power supply device 100 to the external device such as a vehicle on an outer surface of end plate 3. Fixing flange 31 is a plate that is located in a central part of end plate 3 in a vertical direction, extends in a width direction of end plate 3, and is located in a horizontal plane. Fixing flange 31 has a thickness to have an enough strength to firmly fix power supply device 100, and has stop hole 32 for fixing power supply device 100 to the external device. Metal end plate 3 is manufactured by being cast in a shape having fixing flange 31 integrated, or the aluminum end plate is manufactured by casting or by molding with aluminum die casting. However, the end plate can also be manufactured by a metal plate being cut into a shape with a fixing flange. Furthermore, the end plate may have a stacked structure of metal and plastic although the structure is not illustrated.

End plate 3 is provided with female screw holes 33 for bolting bind bar 4 on both side portions of the outer surface. In end plate 3 in FIG. 2, bent pieces 41 coupled to both ends of main body 40 of upper bind bar 4 is each fixed with two bolts 9, bent piece 41 of lower bind bar 4 is fixed with one bolt 9, and thus three female screw holes 33 are each provided on both sides. Female screw holes 33 are provided at fixing positions of bolts 9 so as to extend from the surface toward a back side.

Furthermore, end plate 3 is provided with stopper wall 34 that prevents rotation of bent piece 41X fixed with a single bolt, which is bent piece 41 of lower bind bar 4 fixed with one bolt 9. Stopper wall 34 prevents bent piece 41X fixed with a single bolt from rotating in a direction indicated by arrow A in FIG. 1, that is, in a direction in which main body 40 of bind bar 4 is apart from facing side surface 2C of battery stack 2. Therefore, stopper wall 34 is disposed at a position with which stopper protrusion 44 provided on bent piece 41X fixed with a single bolt is in contact, that is, at a position where stopper wall 34 approaches or is in contact with stopper protrusion 44 when bent piece 41X fixed with a single bolt rotates in the direction indicated by arrow A.

Figure 4:
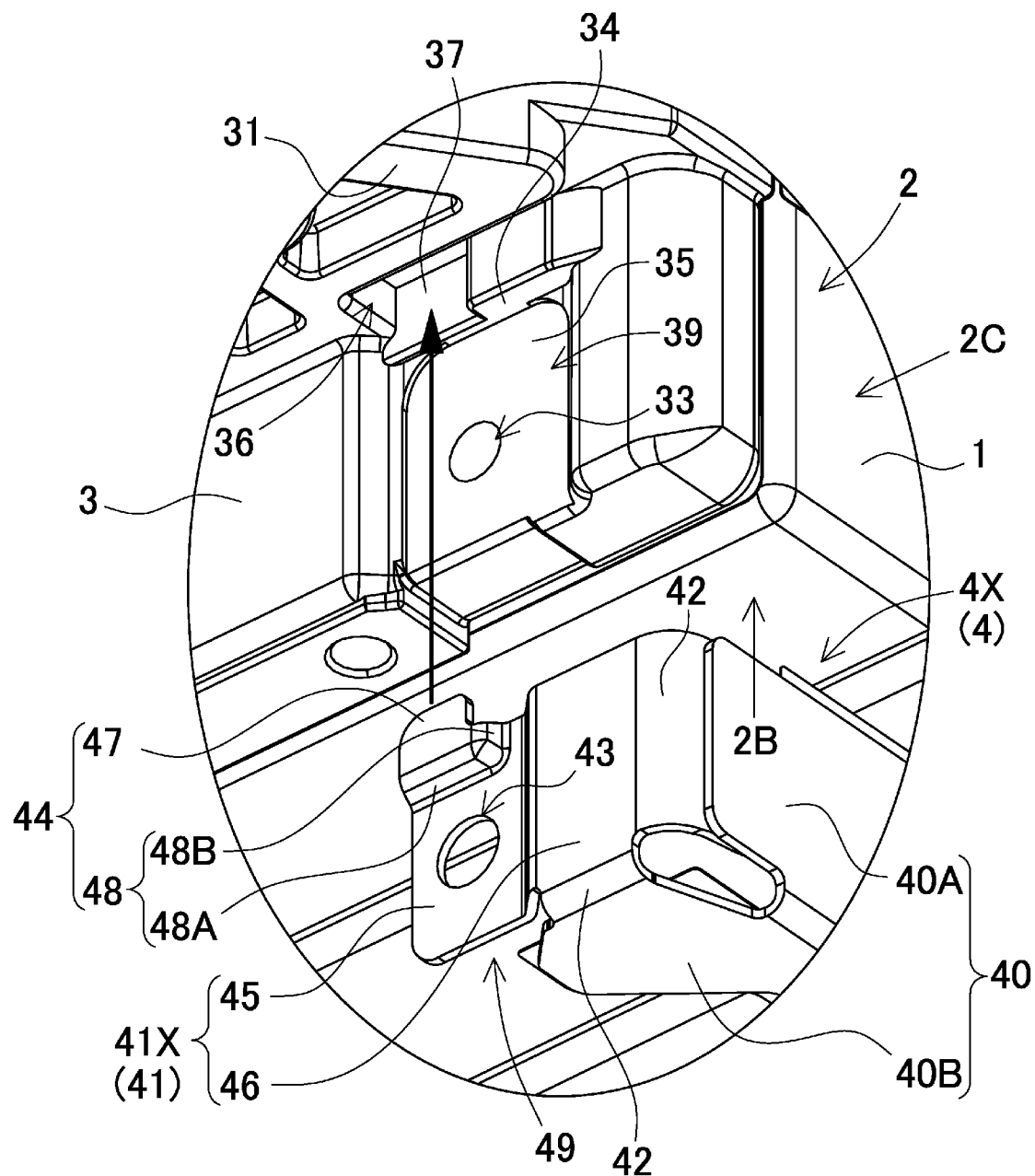
FIG. 4 is an enlarged exploded perspective view illustrating a coupling structure between a bent piece of a bind bar and an end plate.

Stopper wall 34 is a wall surface that vertically projects from fixing and attaching surface 35 of bent piece 41X fixed with a single bolt, and end plate 3 in FIG. 1 is provided with stopper wall 34 on the same plane as a lower surface of fixing flange 31. Furthermore, end plate 3 in FIG. 4 is provided with recess 36 on the lower surface of fixing flange 31 and is provided with recess 36 into which cover plate 47 described later provided to stopper protrusion 44 of bent piece 41X fixed with a single bolt is inserted. End plate 3 has an upper edge of stopper wall 34 formed as planar projecting surface 37, and cover plate 47 is disposed on a surface of projecting surface 37. In order to provide projecting surface 37, fixing flange 31 in the drawing is provided with recess 36 on the lower surface, and an inner surface of recess 36 serves as projecting surface 37. The end plate having this shape is provided with recess 36 on the lower surface of fixing flange 31 to be lightened, and cover plate 47 of bind bar 4 is inserted into recess 36 to couple bind bar 4 to the end plate in a state where bind bar 4 is more reliably prevented from rotating.

(Bind Bar 4)

Bind bar 4 is provided with bent pieces 41 at both the end portions of main body 40 extending in the stacking direction of battery cells 1, and bent pieces 41 are bolted to the outer surface of end plates 3 to fix battery stack 2 between the pair of end plates 3 in the pressurized state. Main body 40 of bind bar 4 is disposed on both the side surfaces of battery stack 2, and has bent pieces 41 coupled to both the end portions. Bind bar 4 has a predetermined thickness and is manufactured by a metal plate such as high-strength steel having a sufficient tensile strength being cut into a predetermined shape and then being bent.

In power supply device 100 in FIG. 1, bind bar 4 is divided in a width direction of facing side surface 2C of battery stack 2, that is, vertically in the figure. Divided bind bars 4 includes first bind bar 4X disposed on a side of bottom surface 2B of battery stack 2, that is, on a lower side in the figure, and second bind bar 4Y disposed on a side of electrode surface 2A of battery stack 2, that is, on an upper side in the drawing. Second bind bar 4Y has bent piece 41 fixed to end plate 3 with two bolts 9, while first bind bar 4X has bent piece 41 fixed to end plate 3 with one bolt 9. Second bind bar 4Y fixed to end plate 3 with a plurality of bolts 9 can be fixed to end plate 3 in a state where bent piece 41 does not rotate. However, bent piece 41 of first bind bar 4X fixed to end plate 3 with one bolt 9, that is, bent piece 41X fixed with a single bolt may rotate around bolt 9 due to vibration or the like.

First bind bar 4X has a cross section of main body 40 formed in an L-shape. Main body 40 has the cross section formed in the L-shape such that side surface cover portions 40A that cover facing side surfaces 2C of battery stack 2 and bottom surface cover portions 40B that cover both sides of bottom surface 2B are coupled at a right angle. As illustrated in a perspective view of FIG. 4, bent piece 41X of first bind bar 4X, which is fixed with a single bolt, is coupled to corner portions 42 of side surface cover portion 40A and bottom surface cover portion 40B. Side surface cover portion 40A and bottom surface cover portion 40B of main body 40 are coupled to two orthogonal sides of bent piece 41X fixed with a single bolt via corner portions 42 each bent at a right angle. In first bind bar 4X having this shape, an outer peripheral edge of bent piece 41X fixed with a single bolt, that is, the two orthogonal sides of bent piece 41X are coupled to main body 40, and thus bent piece 41X fixed with a single bolt and main body 40 can be coupled with a strong bending strength.

Bent piece 41 fixed to end plate 3 with one bolt 9 is characterized by being capable of being easily fixed to end plate 3, but, as illustrated by arrow A in FIG. 1, there is an adverse effect that bent piece 41 easily rotates around bolt 9 due to vibration or the like. When bent piece 41X fixed with a single bolt rotates as illustrated by arrow A in FIG. 1, there is an adverse effect that main body 40 is displaced, side surface cover portion 40A is apart from facing side surface 2C of battery stack 2, battery cells 1 are laterally displaced, and in a worst case, battery cells 1 pop out. Furthermore, bottom surface cover portion 40B provided to main body 40 is also apart from bottom surface 2B of battery stack 2 and cannot hold battery cells 1 on the bottom surface.

In order to prevent the above adverse effects, bent piece 41X fixed with a single bolt has the outer peripheral edge fitted to stopper wall 34 provided on end plate 3, and when bent piece 41 starts to rotate as illustrated by arrow A, the outer peripheral edge of bent piece 41 hits stopper wall 34 to prevent the rotation. Bent piece 41 of first bind bar 4X includes a tip portion as fixing portion 45 and extension portion 46 between fixing portion 45 and corner portions 42. Fixing portion 45 is fixed to fixing and attaching surface 35 of end plate 3 with bolt 9 that penetrates fixing portion 45. Furthermore, fixing portion 45 has a structure in which stopper protrusion 44 is provided at a position facing stopper wall 34 and stopper protrusion 44 is disposed on an inner side of stopper wall 34 to prevent rotation of bent piece 41. In first bind bar 4X illustrated in FIG. 4, bolt hole 43 through which bolt 9 is inserted and stopper protrusion 44 are vertically apart from each other and provided to fixing portion 45 the bent piece 41. Stopper protrusion 44 is disposed on an upper edge of fixing portion 45, and bolt hole 43 is disposed on a side of bottom surface 2B of battery stack 2, so that stopper protrusion 44 and bolt hole 43 are disposed vertically apart from each other.

Stopper protrusion 44 includes cover plate 47 that is disposed on projecting surface 37 of end plate 3 and peripheral wall portion 48 that couples an outer peripheral edge of cover plate 47 to fixing portion 45, and has a structure in which cover plate 47 is disposed on the surface of projecting surface 37 of end plate 3, peripheral wall portion 48 is disposed on the inner side of stopper wall 34, and peripheral wall portion 48 is in contact with stopper wall 34 to prevent the rotation of bent piece 41. Peripheral wall portion 48 of stopper protrusion 44 includes horizontal rib 48A and vertical rib 48B extending in directions intersecting with each other, and horizontal rib 48A and vertical rib 48B reinforce each other to prevent deformation of stopper protrusion 44 in a state where stopper protrusion 44 is in contact with stopper wall 34, and more reliably prevent the rotation of bent piece 41. Horizontal rib 48A is a rib extending in the width direction of end plate 3, and vertical rib 48B is a rib extending in a direction intersecting with horizontal rib 48A, and horizontal rib 48A and vertical rib 48B are coupled in a posture orthogonal to each other.

In addition to the structure in which stopper protrusion 44 of bent piece 41 is brought into contact with stopper wall 34 of end plate 3 to prevent the rotation, first bind bar 4X illustrated in FIG. 2 has a structure in which fixing portion 45 is step protrusion 49 projecting in a direction approaching a surface of end plate 3, end plate 3 is provided with positioning recess 39 to which step protrusion 49 is fitted, and step protrusion 49 is fitted to positioning recess 39 to more reliably prevent the rotation of bent piece 41X fixed with a single bolt.

In power supply device 100 in FIG. 2, the plurality of battery cells 1 are stacked via insulating separators 5 to form battery stack 2, end plates 3 are disposed on both the end surfaces of battery stack 2, and bent pieces 41 of first bind bar 4X and second bind bar 4Y are bolted to end plates 3 with the pair of end plates 3 pressing battery stack 2, to assemble power supply device 100. First bind bar 4X disposes stopper protrusion 44 of bent piece 41 at a position close to or in contact with an inner surface of stopper wall 34 of end plate 3, and further fits step protrusion 49 of fixing portion 45 to positioning recess 39 provided to end plate 3, and bolt 9 penetrating fixing portion 45 is screwed into end plate 3, so that first bind bar 4X is fixed to end plate 3. Second bind bar 4Y is fixed to end plate 3 with two bolts 9. In a state where bind bar 4 is fixed to the pair of end plates 3, metal plate bus bar (not illustrated) is coupled to electrode terminals 13 of battery cells 1 by welding or screwing, battery cells 1 are connected in series or in parallel via the bus bar, and a circuit substrate, although not illustrated, on which a protection circuit of battery cells 1 and the like are mounted is further disposed in a fixed position so as to face electrode surface 2A of battery stack 2, so that power supply device 100 is assembled.

The above power supply device is optimal for a power supply device for a vehicle that supplies electric power to a motor that runs an electric vehicle. As the electric vehicle on which the power supply device is mounted, an electric vehicle such as a hybrid automobile or a plug-in hybrid automobile that runs with both an engine and the motor, or an electric automobile that runs only with the motor can be used, and the power supply device is used as a power source for these electric vehicles.

(Power Supply Device for Hybrid Vehicle)

Figure 5:
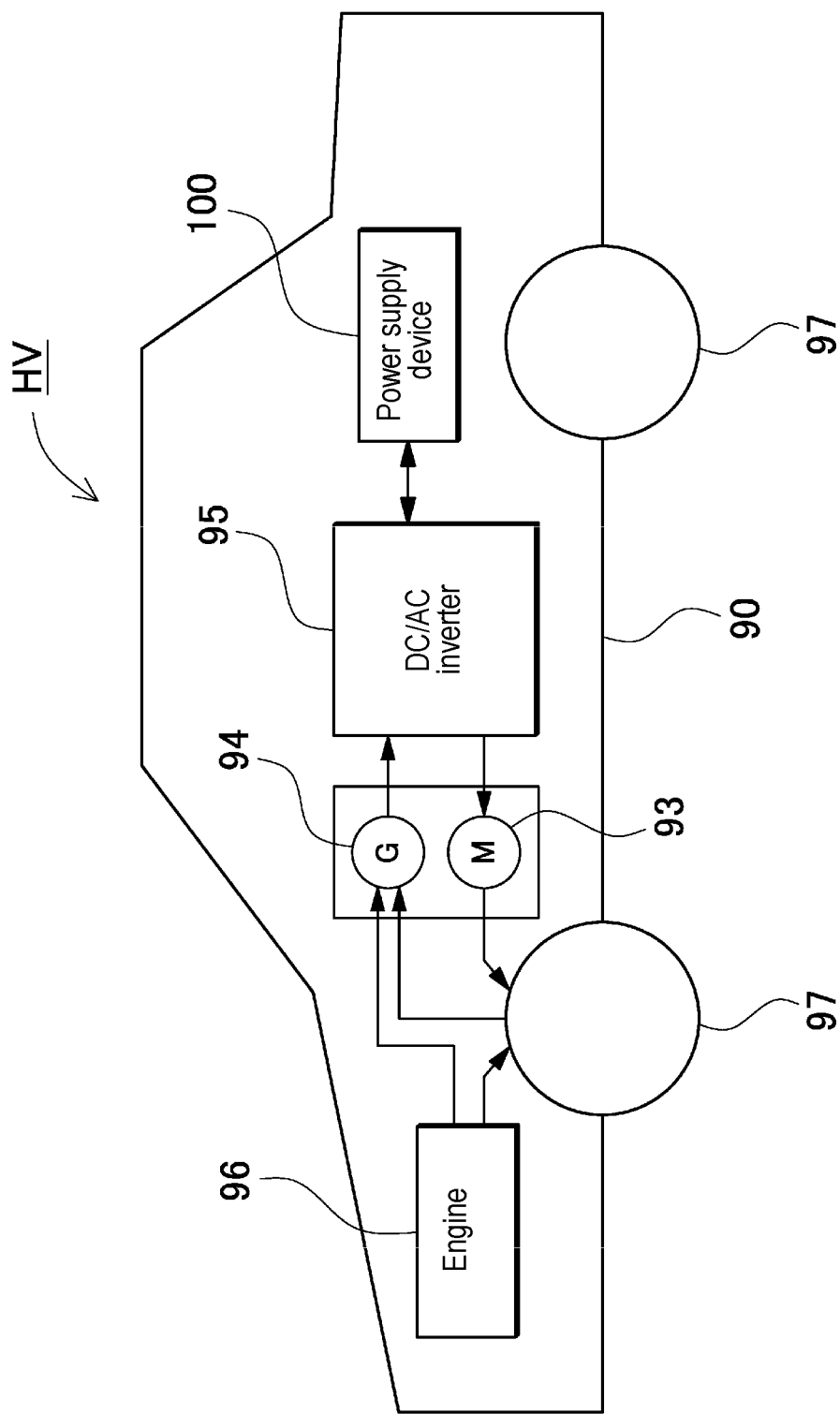
FIG. 5 is a block diagram illustrating an example of mounting the power supply device on a hybrid car that runs with an engine and a motor.

FIG. 5 illustrates an example of mounting the power supply device on the hybrid vehicle that runs with both the engine and the motor. Vehicle HV on which the power supply device is mounted illustrated in this figure includes vehicle body 90, engine 96 and running motor 93 that run vehicle body 90, power supply device 100 that supplies electric power to motor 93, generator 94 that charges a battery of power supply device 100, and wheels 97 that are driven by motor 93 and engine 96 to run vehicle body 90. Power supply device 100 is connected to motor 93 and generator 94 via direct current (DC)/alternating current (AC) inverter 95. Vehicle HV runs with both motor 93 and engine 96 while charging and discharging the battery of power supply device 100. Motor 93 runs the vehicle by being driven in a region where engine efficiency is low, for example, during acceleration or low speed running. Motor 93 is driven by the electric power supplied from power supply device 100. Generator 94 is driven by engine 96 or regenerative braking when the vehicle is braked, to charge the battery of power supply device 100.

(Power Supply Device for Electric Automobile)

Figure 6:
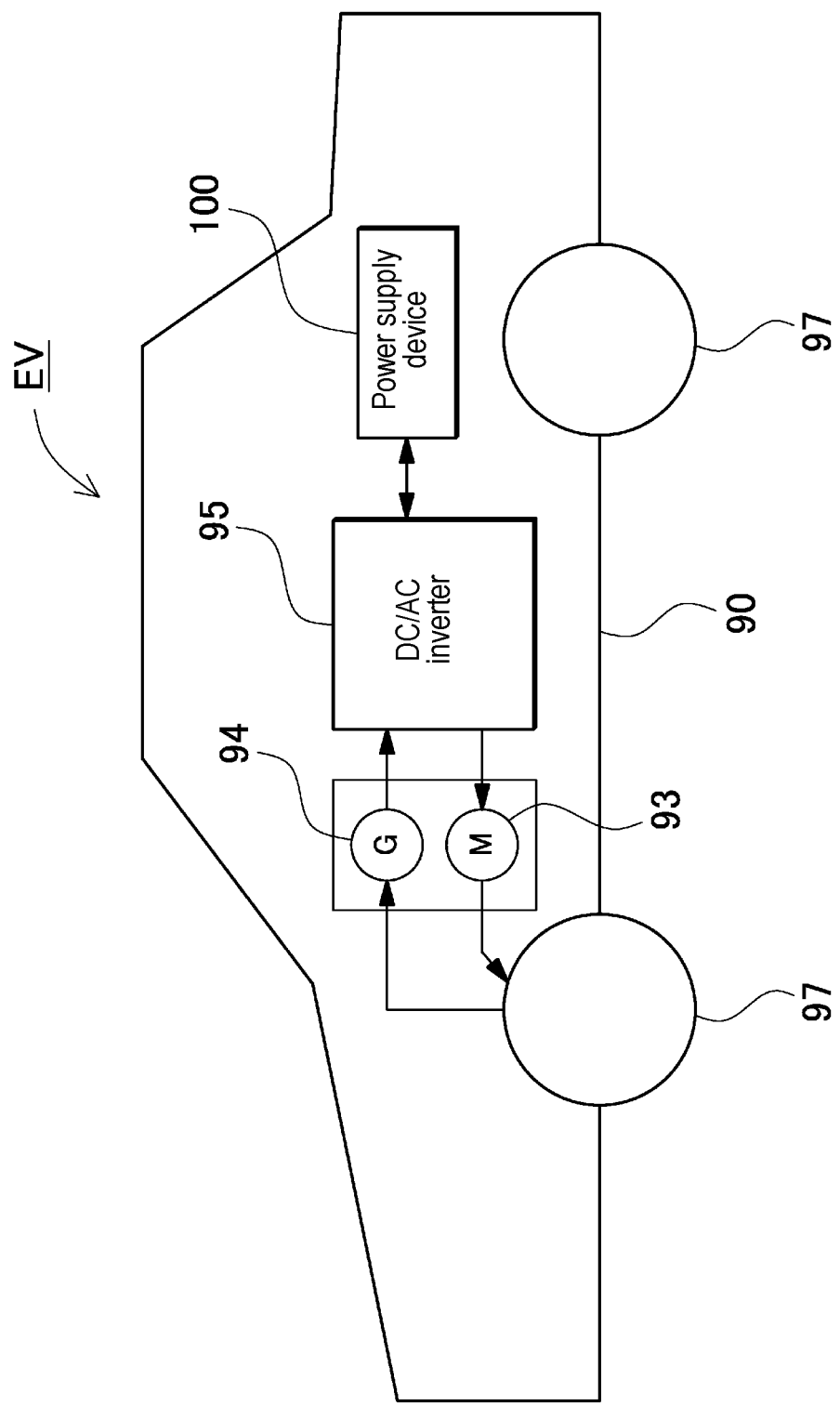
FIG. 6 is a block diagram illustrating an example of mounting the power supply device on an electric automobile that runs only with the motor.

Furthermore, FIG. 6 illustrates an example of mounting the power supply device on the electric automobile that runs only with the motor. Vehicle EV on which the power supply device is mounted illustrated in this figure includes vehicle body 90, running motor 93 that runs vehicle body 90, power supply device 100 that supplies electric power to motor 93, generator 94 that charges the battery of power supply device 100, and wheels 97 that are driven by motor 93 to run vehicle body 90. Motor 93 is driven by the electric power supplied from power supply device 100. Generator 94 is driven by an energy for regenerative braking of vehicle EV to charge the battery of power supply device 100.

INDUSTRIAL APPLICABILITY

A power supply device according to the present invention and a vehicle including the power supply device can be suitably used as a power supply device for a plug-in hybrid electric automobile and a hybrid electric automobile that can switch between an electric vehicle (EV) running mode and a hybrid electric vehicle (HEV) running mode, an electric automobile, and the like.

The invention claimed is:

1. A power supply device comprising:
   a battery stack where a plurality of battery cells are stacked;
   a pair of end plates that are disposed at both end portions of the battery stack; and
   a bind bar that extends in a stacking direction of the plurality of battery cells of the battery stack and has both end portions coupled to the end plates,
   wherein the battery stack is a quadrangular prism extending in the stacking direction of the battery cells, and has four surrounding surfaces including an electrode surface where sealing plates of the plurality of battery cells are disposed on a same plane, a bottom surface on an opposite side of the electrode surface, and facing side surfaces where the bind bar is disposed,
   the bind bar is divided in a width direction of the facing side surfaces, and each of the divided bind bars includes a bent piece that is fixed and attached to a surface of one of the pair of end plates,
   at least one of the divided bind bars further includes a bent piece fixed with a single bolt, the bent piece being fixed to the one of the pair of end plates via one bolt,
   the one of the pair of end plates includes a stopper wall where an outer peripheral edge of the bent piece fixed with the single bolt is fitted to prevent rotation,
   the bent piece fixed with the single bolt is in contact with the stopper wall to be fixed to the pair of one of the end plates in a state where the rotation is prevented,
   the one of the pair of end plates includes a planar projecting surface extending from an upper edge of the stopper wall and projecting in the stacking direction away from an outer surface of the one of the pair of end plates, and
   the bent piece of the bind bar includes:
   a fixing portion configured to be bolted to the outer surface of the one of the pair of end plates, and
   a stopper protrusion projecting in the stacking direction away from the fixing portion, the stopper protrusion including:
   a cover plate configured to overlap the planar projecting surface in the stacking direction, and
   a peripheral wall portion of the cover plate configured to oppose the stopper wall in a direction perpendicular to the stacking direction.

2. The power supply device according to claim 1, wherein the stopper protrusion is provided at a position facing the stopper wall.

3. The power supply device according to claim 1, wherein the bind bar includes a first bind bar that is disposed on a side of the bottom surface of the battery stack, and a second bind bar that is disposed on a side of the electrode surface of the battery stack, and
   the first bind bar includes the bent piece fixed with the single bolt.

4. The power supply device according to claim 1, wherein the bent piece fixed with the single bolt includes the stopper protrusion and a bolt hole where the bolt is inserted, the stopper protrusion and the bolt hole being apart from each other, and
   the bolt hole is disposed closer to the bottom surface of the battery stack than the stopper protrusion.

5. The power supply device according to claim 1, wherein the bent piece fixed with the single bolt, of the bind bar, further includes:
   an extension portion that is provided between the fixing portion and a corner portion of the bind bar,
   the fixing portion is a step protrusion projecting in a direction approaching the surface of the one of the pair of end plates,
   the one of the pair of end plates includes a positioning recess where the step protrusion is fitted, and
   the step protrusion is disposed on the positioning recess to prevent the rotation of the bind bar.

6. The power supply device according to claim 1, wherein the cover plate is disposed on the projecting surface of the stopper wall of the one of the pair of end plates,
   the peripheral wall portion couples an outer peripheral edge of the cover plate to the fixing portion,
   and
   the peripheral wall portion is in contact with the stopper wall to prevent the rotation of the bind bar.

7. The power supply device according to claim 1, wherein the peripheral wall portion includes a horizontal rib and a vertical rib extending in directions intersecting with each other.

8. The power supply device according to claim 7, wherein the horizontal rib is a rib extending in a width direction of the one of the pair of end plates, and the vertical rib is a rib extending in a direction intersecting with the horizontal rib.

9. The power supply device according to claim 1, wherein the bind bar is a metal plate, and each of the pair of end plates is a metal block having a structure which is entirely integrated.

10. An electric vehicle including the power supply device according to claim 1, the electric vehicle comprising:
    the power supply device;
    a running motor that is supplied with electric power from the power supply device;
    a vehicle body including the power supply device and the running motor; and
    wheels that are driven by the running motor to run the vehicle body.

\* \* \* \* \*